April 7, 1970

G. W. HALLIDAY 3,504,920

SHAFT SEALS

Filed July 3, 1967

April 7, 1970  G. W. HALLIDAY  3,504,920
SHAFT SEALS

Filed July 3, 1967  2 Sheets-Sheet 2

United States Patent Office 3,504,920
Patented Apr. 7, 1970

1

3,504,920
SHAFT SEALS
Geoffrey W. Halliday, Whitley Bay, England, assignor to George Angus & Company Limited, Newcastle upon Tyne, England
Filed July 3, 1967, Ser. No. 650,699
Claims priority, application Great Britain, July 7, 1966, 30,628/66
Int. Cl. F16j 15/32, 15/48
U.S. Cl. 277—134                    7 Claims

ABSTRACT OF THE DISCLOSURE

A shaft seal of the lip type has its outer frusto-conical surface provided with helical ridges or grooves meeting the sealing band in opposite peripheral directions respectively at a small angle, not more than 20° and preferably 10° or 5°, to provide a fluid feed-back effect in either direction of shaft rotation.

Figure 1:
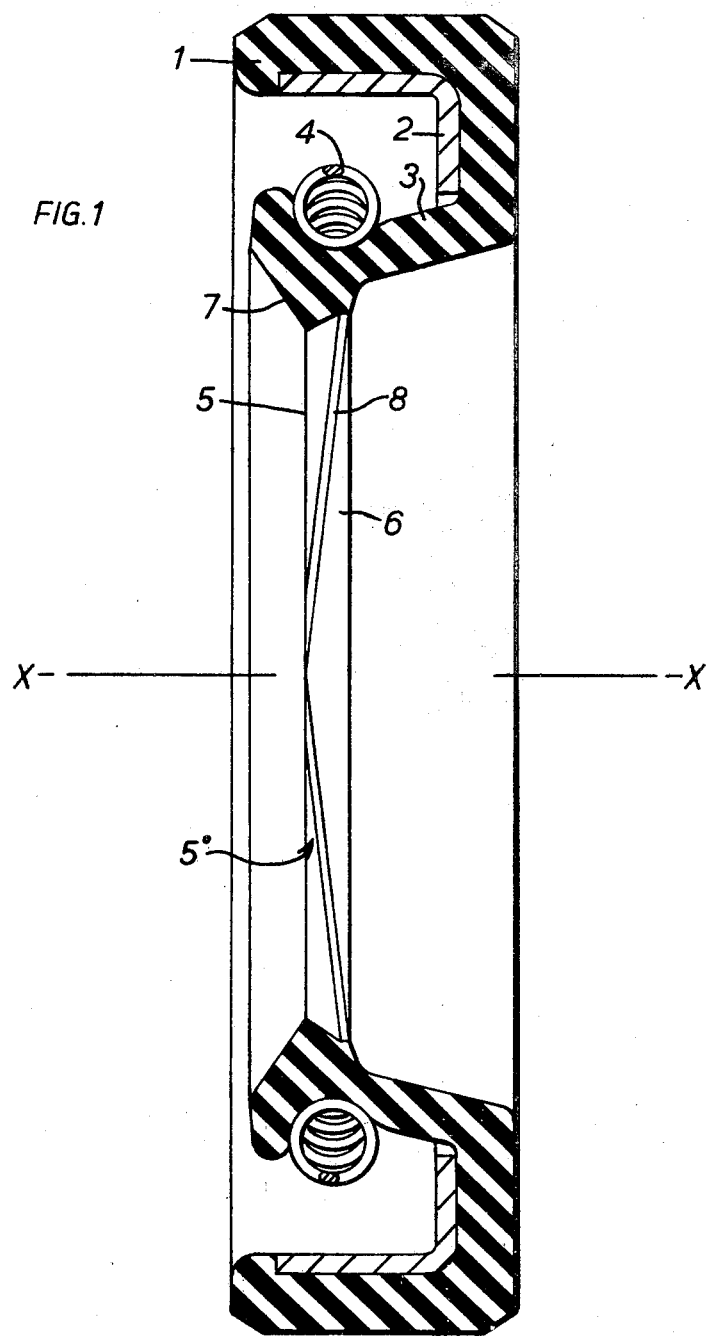

This invention relates to shaft seals, also known as oil seals, designed for sealing against fluid leakage along shafts, such as engine crankshafts or motor vehicle drive-transmission shafts, which are difficult to seal because of such factors as shaft deflection, torsional oscillation and eccentricity in motion.

It has long been known that the sealing of such shafts can be improved by providing at the sealed periphery some form of return feed screw, or feed-back scroll, formed by a helical ridge or groove on the shaft or seal surface. By suitable selection of the direction of the helix in relation to the normal direction of rotation of the shaft, the effect of relative rotation is to feed back oil or other fluid tending to leak past the seal.

The most convenient way of providing a feed-back effect is to form the required ridge or groove on the sealing periphery of the seal so that shaft modification is not required and the seal will operate on the cylindrical surface of any shaft of the appropriate size.

Known feed-back seals will give satisfactory results in one direction of rotation for which they are designed but for reversible shafts, in particular motor vehicles drive or transmission shafts, there is a requirement for a feed-back seal which will serve in either direction of rotation.

The present invention provides feed-back shaft seals designed to provide a feed-back effect in either direction of rotation.

The invention is applied to a shaft seal comprising a moulded sealing ring of resilient material having a peripheral sealing lip with a circumferential sealing band between inner and outer frusto-conical surfaces, respectively facing towards and away from sealed fluid when the seal is in use, the outer frusto-conical surface being provided with vane surface members, each being a surface of a ridge or groove obliquely meeting the sealing band. According to the invention, at least two of such vane surface members respectively meet the sealing band in opposite peripheral directions at an angle of not more than 20° to the plane of the sealing band.

Usually, in a sealing ring as manufactured, the sealing band is an edge formed by the junction of the frusto-conical surfaces but initial wear of a sealing ring in use, known as "bedding-in," axially widens the edge to a narrow band, also known as the "contact band." A corresponding band could however be formed in manufacture of a sealing ring.

The term "vane surface member" has been chosen as a descriptive and generic term for a ridge or groove presenting a surface which, on rotation relatively to a fluid to which it is exposed, will impel the fluid.

2

In the seal of the present invention, the ends of the vane surface members which meet the sealing band act like helical pump vanes to feed back oil tending to leak past the sealing edge and it is found that oppositely-directed vane surface members which meet the sealing band at a small angle are effective to feed back oil in either direction of shaft rotation. In meeting the sealing band, the vane surface members may also extend into the sealing band.

For best results, the angle at which the vane surface members meet the sealing band should be less than 20°, preferably 10° and if possible not more than 5°. It will be appreciated that the smaller the meeting angle the greater the length of surface contact between the vane surface members and the sealed surface but the fewer the number of vane surface members which can meet the sealing band in opposite directions. A compromise between a small meeting angle and the number of vane surface members must therefore be made according to the size of a seal and sealing requirements.

Figure 3:
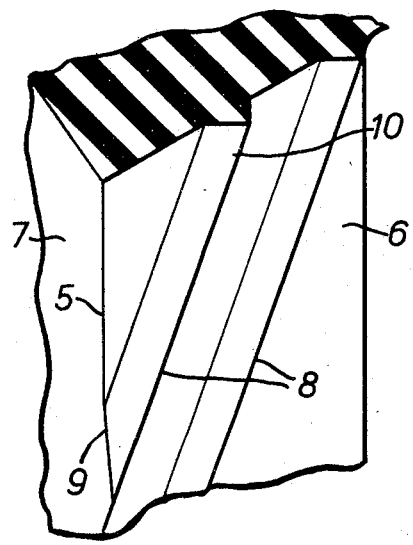
Figure 2:
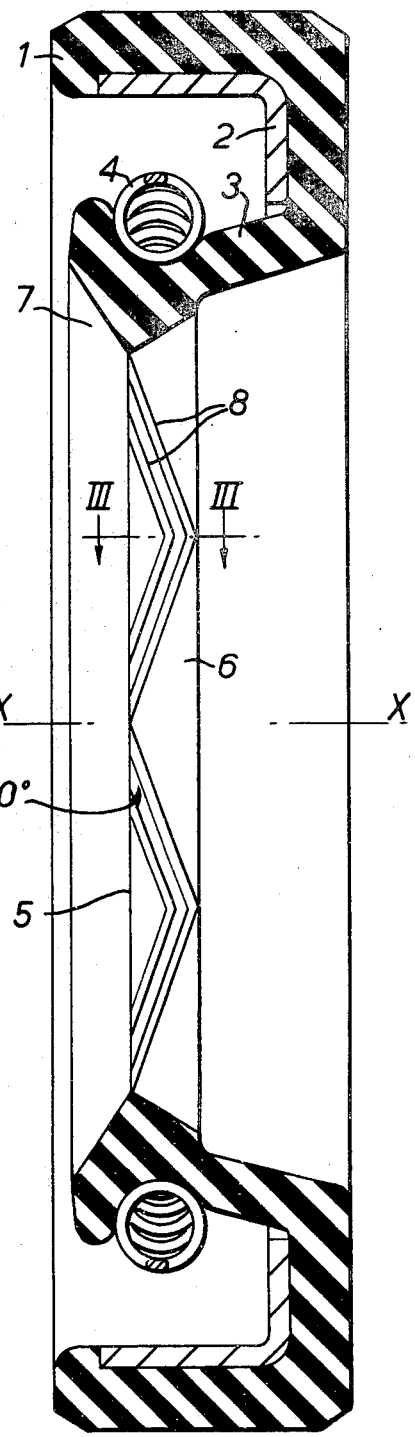

Two examples of shaft seals in accordance with the invention will be described with reference to the accompanying drawings, in which:

FIGS. 1 and 2 are diametral axial sections showing alternative forms of internal lip-type shaft seals and FIG. 3 is a fragmentary radial section on the line III—III of FIG. 2.

The seals illustrated are basically of the same known kind, comprising a moulded synthetic rubber or like sealing ring of channel-section having an outer cylindrical wall 1 stiffened by an L-section reinforcing ring 2, to form a holding portion for mounting the seal in a shaft housing, and a flexible flange 3 embraced by a garter spring 4.

The inner periphery of the flange 3 provides a sealing lip, to seal around the cylindrical surface of a shaft, having a circular sealing edge 5 formed by the junction of a moulded frusto-conical outer surface 6, which faces outwardly away from the sealed fluid when the seal is in use, and a cut frusto-conical inner surface 7 which faces the sealed fluid in use.

The inner frusto-conical surface 7 is cut, by a trimming knife against which the moulded seal is turned, so as to obtain the desired angle of the surface 7 and accurate formation and location of the sealing edge 5.

As so far described, the seals illustrated are of known construction and it is also known for the outer frusto-conical surface 6 to be moulded with a screw-thread or helical ridges or grooves so as to give a feed-back effect, due to relative shaft rotation in one direction, on fluid leaking past the sealing edge 5.

The novel feature of the present invention, as embodied in the seals illustrated, is that the surface 6 has moulded therein at least two oppositely-directed helical ridges 8 (FIG. 1) or an even number of stepped series of parallel ridges 8 (FIG. 2) each lying in a plane which is oblique to the plane of the sealing edge 5. The angle of obliquity can be selected to suit requirements but must not be greater than 20°, as shown by FIG. 2, and is preferably much smaller, for example 5° as shown by FIG. 1.

In the sealing ring as moulded, the ridges 8 cross the plane of the eventual sealing edge 5 and when this edge is formed, by cutting of the inner frusto-conical surface 7, the portions of ridges beyond the plane of the edge 5 are cut off leaving the remainder of such ridges intercepting the edge 5 to provide the required oppositely-directed vane surfaces 9 (FIG. 3) meeting the sealing edge 5 which, when bedded-in by initial wear in use, becomes modified to a contact band of greater axial width. Also, it must be remembered that the sealing lip is stretched slightly when fitted on a shaft and is also constricted by the garter spring 4 so that the resultant radial load on the resilient material of the lip still further modifies the character of the contact band.

Although the ridges 8 lie slightly oblique to the plane of the seal, their flanks 10 (FIG. 3) can be made substantially cylindrical about the axis X—X of the sealing ring which permits true axial withdrawal of the sealing ring from its mould without risk of damage to the ridges.

The ridges 8 could be replaced by corresponding grooves and, in fact, a stepped, substantially L-section ridge, or series of ridges, can be regarded as a groove or grooves.

The invention has been described and illustrated as applied to an internal shaft seal but it could be applied to an external seal which, as is well known, is mounted on a shaft to rotate therewith and seal against a surrounding cylindrical surface of a housing. In an external seal, the relative positions of the holding portion wall 1 and the flange 3 are inverted and the garter spring 4 acts radially outwardly.

The resilient material of the sealing ring may be synthetic rubber, as mentioned above, or natural rubber or like material such as the plastics materials known as elastomers.

What is claimed is:

1. A shaft seal comprising a moulded sealing ring of resilient material having a peripheral sealing lip, said lip having inner and outer, mutually convergent, peripheral frusto-conical surfaces, respectively facing towards and away from the fluid-sealing side of the seal, a continuous circumferential sealing band coaxial with said ring being defined on said lip by the convergence of said frusto-conical surfaces, said outer frusto-conical surface having formed thereon a plurality of pairs of vane members obliquely meeting said sealing band at an angle of not more than 20° to the plane of said sealing band, the vane members of each said pair each having a flank surface progressively joining said sealing band respectively in opposite circumferential directions, and each said flank surface being operative as a vane surface, for one direction and the other respectively of relative shaft rotation when the seal is in use, to sweep back to said sealing band fluid leaking past said sealing band.

2. A shaft seal according to claim 1, in which said vane members of said pairs are oppositely helical ridges moulded in said outer-frusto-conical surface and meeting said sealing band in opposite circumferential directions at an angle of not more than 5°.

3. A shaft seal according to claim 1, in which said vane members meet said sealing band in opposite circumferential directions at an angle of not more than 10°.

4. A shaft seal according to claim 3, in which said vane members meet said sealing band at an angle of not more than 5°.

5. A shaft seal according to claim 2, in which said ridges are each substantially of L-section with a said flank surface thereof substantially cylindrical about the axis of said sealing ring.

6. A shaft seal according to claim 1, in which said outer frusto-conical surface of said sealing ring has moulded therein an even number of stepped series of parallel ridges alternately meeting said sealing band in opposite circumferential directions at an angle of not more than 20°, said ridges providing said pairs of vane members.

7. A shaft seal according to claim 6, in which said ridges are each substantially of L-section with a said flank surface thereof substantially cylindrical about the axis of said sealing ring.

References Cited

UNITED STATES PATENTS

| 2,446,380 | 8/1948 | Meyers et al. | 277—134 X |
| 3,376,045 | 4/1968 | Jagger | 277—134 |

FOREIGN PATENTS

| 499,480 | 1/1939 | Great Britain. |
| 888,198 | 1/1962 | Great Britain. |

SAMUEL ROTHBERG, Primary Examiner